United States Patent
Kayaba et al.

(10) Patent No.: US 12,013,708 B2
(45) Date of Patent: Jun. 18, 2024

(54) GAS SAFETY DEVICE

(71) Applicant: Panasonic Intellectual Property Management Co., Ltd., Osaka (JP)

(72) Inventors: Takashi Kayaba, Kyoto (JP); Yuji Fujii, Nara (JP); Kenji Yasuda, Kyoto (JP); Masanori Nakamura, Nara (JP); Yuki Anan, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 795 days.

(21) Appl. No.: 17/044,879

(22) PCT Filed: May 28, 2019

(86) PCT No.: PCT/JP2019/020983
§ 371 (c)(1),
(2) Date: Oct. 2, 2020

(87) PCT Pub. No.: WO2019/235291
PCT Pub. Date: Dec. 12, 2019

(65) Prior Publication Data
US 2021/0116945 A1    Apr. 22, 2021

(30) Foreign Application Priority Data
Jun. 8, 2018 (JP) ................. 2018-109896

(51) Int. Cl.
*G05D 7/06* (2006.01)
*G01F 1/667* (2022.01)
*G01L 13/00* (2006.01)

(52) U.S. Cl.
CPC ........... *G05D 7/0623* (2013.01); *G01F 1/667* (2013.01); *G01L 13/00* (2013.01)

(58) Field of Classification Search
CPC .. G05D 7/0623; G05D 16/2013; G01L 15/00; Y10T 137/2012
See application file for complete search history.

(56) References Cited

U.S. PATENT DOCUMENTS 6,903,659 B2 *  6/2005  Vanderah ............. G05B 19/042
                                                340/636.15
7,604,019 B2 * 10/2009  Frampton .............. F16K 1/306
                                                128/205.24

(Continued)

FOREIGN PATENT DOCUMENTS

CN    102803659    11/2012
CN    202885884    4/2013

(Continued)

OTHER PUBLICATIONS

International Search Report of PCT application No. PCT/JP2019/020983 dated Sep. 3, 2019.

(Continued)

*Primary Examiner* — Reinaldo Sanchez-Medina
(74) *Attorney, Agent, or Firm* — WENDEROTH, LIND & PONACK, L.L.P.

(57) ABSTRACT

A gas safety device includes: a flow path; a flow rate measurement unit for measuring a flow rate of gas in the flow path; an absolute pressure sensor inside the flow path for measuring an absolute pressure of the gas; an absolute pressure sensor outside the flow path for measuring an absolute pressure of atmospheric pressure; a gas pressure determination unit for measuring a change in gas supply pressure from the absolute pressure of the gas and the absolute pressure of atmospheric pressure measured by the absolute pressure sensor and the absolute pressure sensor, respectively; a shutoff valve for shutting off the flow path; and a control circuit for: (i) controlling the flow rate measurement unit; and (ii) causing the shutoff valve to shut off (Continued)

the flow path when determining an abnormality from the flow rate of the gas or the change in gas supply pressure.

11 Claims, 6 Drawing Sheets

(56) References Cited

U.S. PATENT DOCUMENTS

| | | | | |
|---|---|---|---|---|
| 2004/0007186 A1* | 1/2004 | Saito | ............... | G05D 16/2013 |
| | | | | 118/724 |
| 2004/0016465 A1* | 1/2004 | Wingert | ............ | G05D 16/2013 |
| | | | | 137/625.65 |
| 2011/0100094 A1 | 5/2011 | Konrad et al. | | |
| 2013/0031949 A1 | 2/2013 | Gaully et al. | | |
| 2013/0306893 A1* | 11/2013 | Naganuma | ......... | F02M 21/0242 |
| | | | | 251/129.11 |
| 2013/0312537 A1* | 11/2013 | Miyata | ................ | G01F 1/662 |
| | | | | 73/861.28 |
| 2018/0120194 A1* | 5/2018 | Roth | ............... | H05K 7/20354 |

FOREIGN PATENT DOCUMENTS

| | | |
|---|---|---|
| CN | 103303078 | 9/2013 |
| CN | 205537807 | 8/2016 |
| JP | 2004-529433 | 9/2004 |
| JP | 2014-098563 | 5/2014 |
| WO | 02/090894 | 11/2002 |
| WO | 2016/121134 | 8/2016 |
| WO | 2017/095241 | 6/2017 |

OTHER PUBLICATIONS

Search Report issued Nov. 29, 2023 in Chinese Patent Application No. 201980037853.3.

* cited by examiner

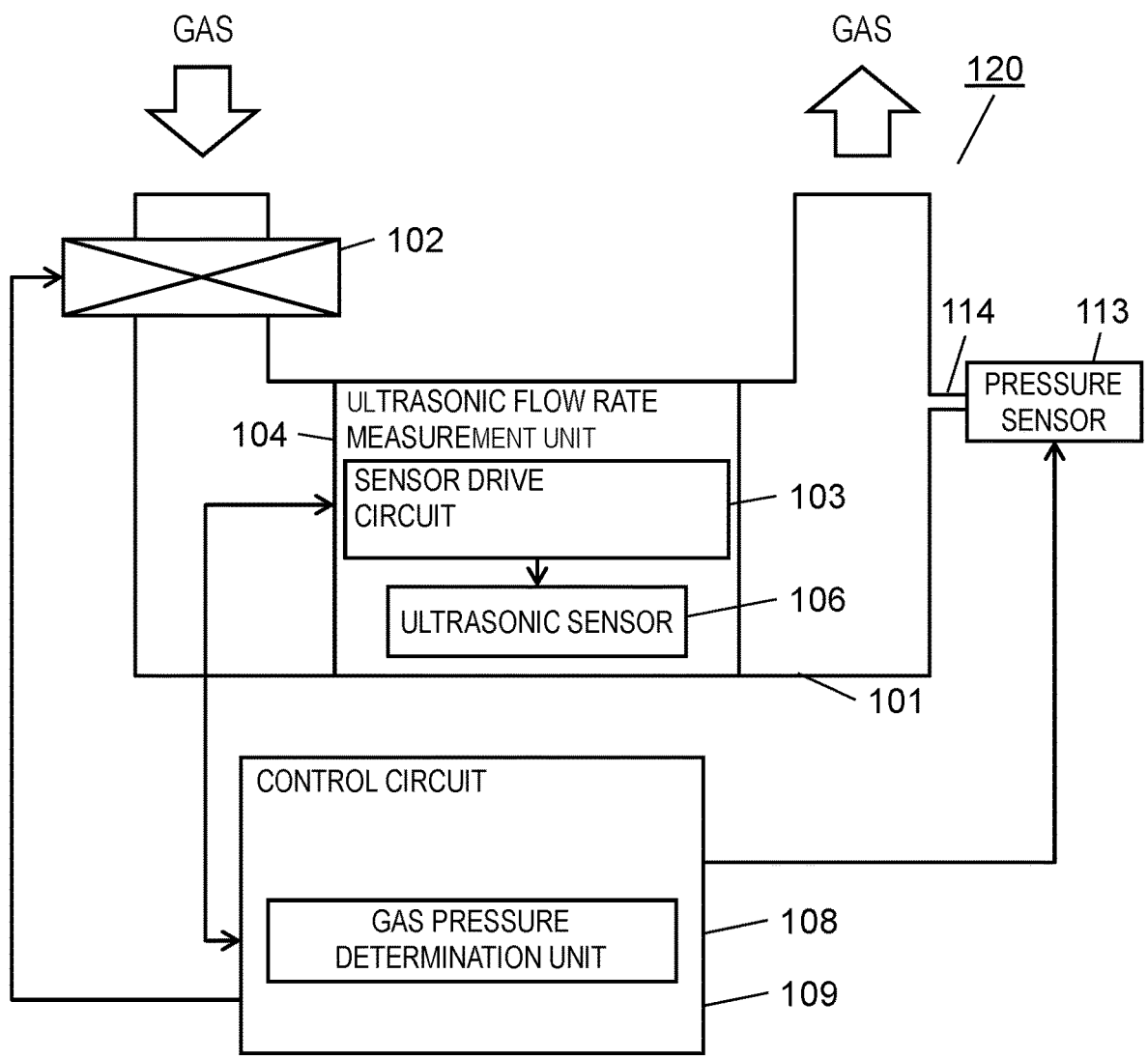

GAS SAFETY DEVICE

CROSS-REFERENCE TO RELATED APPLICATIONS

This application is a U.S. national stage application of the PCT International Application No. PCT/JP2019/020983 filed on May 28, 2019, which claims the benefit of foreign priority of Japanese patent application No. 2018-109896 filed on Jun. 8, 2018, the contents all of which are incorporated herein by reference.

TECHNICAL FIELD

The present invention relates to a gas safety device that ensures safety in gas use by measuring a gas flow rate and shutting off a gas passage when an abnormal flow rate is measured.

BACKGROUND ART

In recent years, a gas safety device including a safety device built in a gas meter for measuring the amount of gas usage has become widespread, the gas safety device determining abnormality when a large amount of flow rate is measured or gas has not been used for an unprecedentedly long time and shutting off a gas passage to ensure safety.

There is also a gas safety device that includes a pressure sensor and has a function of determining whether supply pressure of gas is abnormal, notifying a center, and shutting off the gas.

Examples of a method for measuring a flow rate of this type of gas safety device include a membrane method that measures a flow rate from a volume having passed through a meter within a predetermined time, an ultrasonic method that measures an instantaneous flow rate by operating an ultrasonic sensor at predetermined time intervals, a thermal method, and a fluidic method.

Hereinafter, a conventional gas safety device using an ultrasonic method will be described with reference to FIG. 6.

Conventional gas safety device 120 measures a flow rate of gas flowing inside flow path 101 using ultrasonic sensor 106 and ultrasonic sensor drive circuit 103. Ultrasonic sensor 106 typically includes a pair of ultrasonic sensors capable of transmitting and receiving that is provided on respective upstream and downstream sides along a gas flow direction. Gas safety device 120 illustrated in FIG. 6 includes ultrasonic flow rate measurement unit 104 that is integrated with a circuit board composed of ultrasonic sensor 106 and ultrasonic sensor drive circuit 103, and that is installed in a gas atmosphere (see, e.g., Unexamined Japanese Patent Publication No. 2014-98563).

Gas safety device 120 then has functions of allowing control circuit 109 to integrate the amount of gas usage using flow rate measurement data measured by ultrasonic flow rate measurement unit 104, and displaying an integration result on a display unit (not illustrated). Control circuit 109 determines whether a flow rate measured by ultrasonic flow rate measurement unit 104 is abnormal. When control circuit 109 determines that the flow rate is abnormal, shutoff valve 102 provided in flow path 101 shuts off flow path 101 to stop gas supply. Gas safety device 120 also includes pressure sensor 113 for measuring a pressure difference between supply pressure and atmospheric pressure. When gas pressure determination unit 108 determines that the pressure measured by pressure sensor 113 is abnormal, the abnormality is notified to a center (not illustrated) or shutoff valve 102 shuts off flow path 101 to stop the gas supply.

SUMMARY OF THE INVENTION

Unfortunately, pressure sensor 113 built in conventional gas safety device 120 is a differential pressure measurement type that measures pressure of gas with reference to the atmospheric pressure, so that through-hole 114 for injecting the gas into pressure sensor 113 is required to be provided in flow path 101. This causes a problem that gas leaks through through-hole 114 due to deformation or burned-out of pressure sensor 113 when temperature in a periphery of gas safety device 120 becomes extremely high due to a fire or the like in the periphery. There is also a problem that a very expensive member is required to improve heat resistance of the pressure sensor itself.

The present invention provides a gas safety device that does not eject gas even when temperature in a periphery of the gas safety device becomes high.

A gas safety device according to the present disclosure includes a flow path for flowing gas, a flow rate measurement unit for measuring a flow rate of the gas flowing through the flow path, a first absolute pressure sensor disposed inside the flow path to measure an absolute pressure of the gas, a second absolute pressure sensor disposed outside the flow path to measure an absolute pressure of atmospheric pressure, and a gas pressure determination unit that measures a change in gas supply pressure from the absolute pressure of the gas and the absolute pressure of the atmospheric pressure measured by the first absolute pressure sensor and the second absolute pressure sensor, respectively. The gas safety device according to the present disclosure further includes a shutoff valve that shuts off the flow path, and a control circuit that controls the flow rate measurement unit and that causes the shutoff valve to shut off the flow path when determining abnormality from the flow rate of the gas measured by the flow rate measurement unit or the change in gas supply pressure measured by the gas pressure determination unit.

This configuration does not require a through-hole for a pressure sensor to be provided in the flow path, and thus enables providing a gas safety device capable of preventing ejection of gas even when temperature in a periphery of the gas safety device becomes extremely high due to a fire or the like in the periphery.

The gas safety device of the present disclosure does not use a pressure sensor of differential pressure measurement type, so that a conventionally required through-hole for injecting gas into the pressure sensor is not required to be provided in the flow path. Thus, ejection of the gas can be prevented even when temperature in a periphery of the gas safety device becomes extremely high due to a fire or the like in the periphery.

Additionally, a mechanism for mounting a pressure sensor is unnecessary and a pressure sensor composed of electronic components mountable on a circuit board can be used. This enables providing a gas safety device with a cheaper and simpler structure, so that the gas safety device can be reduced in cost.

BRIEF DESCRIPTION OF DRAWINGS

FIG. 6 is a configuration diagram of a gas safety device of a conventional example.

DESCRIPTION OF EMBODIMENTS

First Exemplary Embodiment

Figure 1:
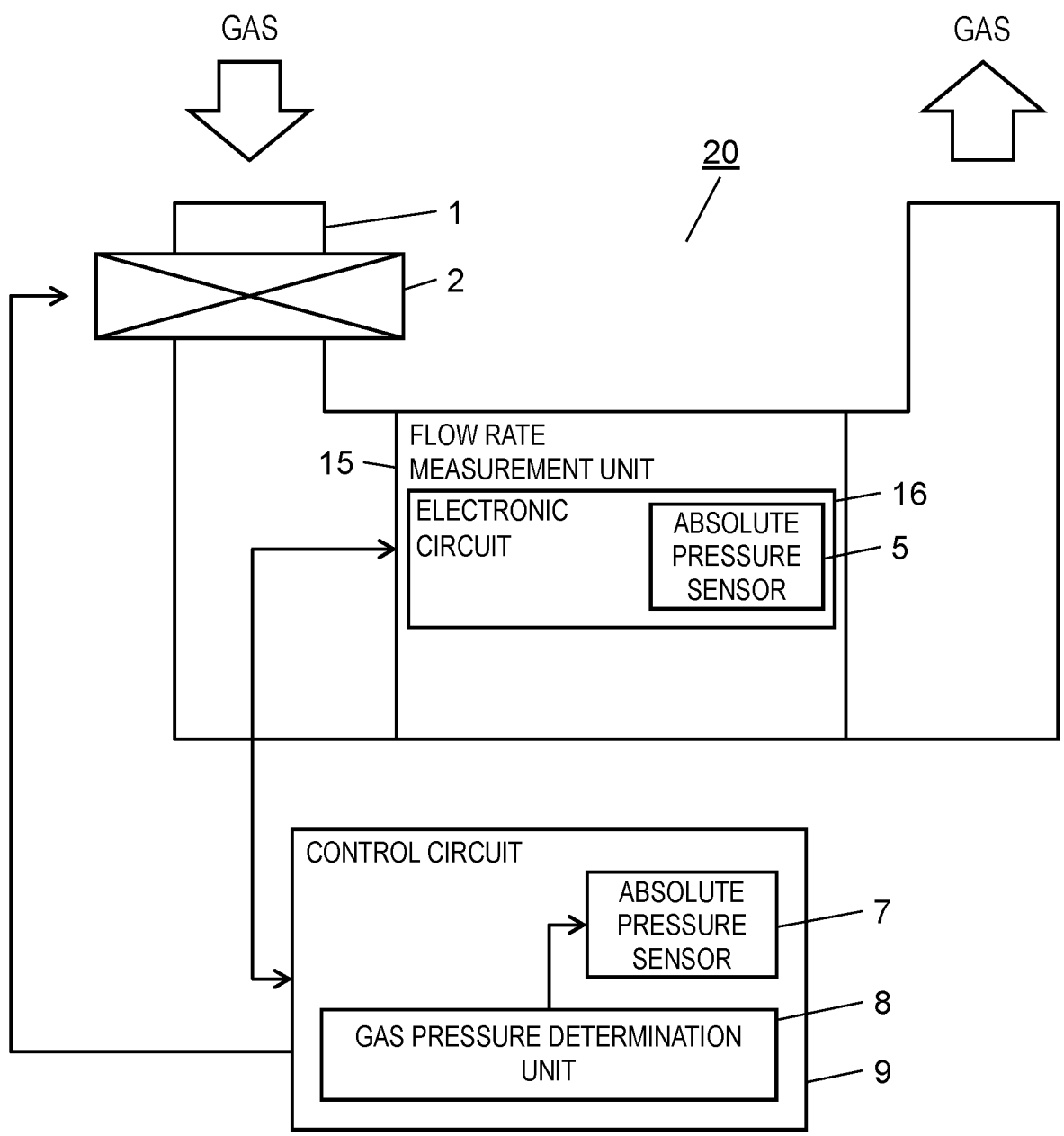
FIG. 1 is a configuration diagram of a gas safety device according to a first exemplary embodiment.

FIG. 1 is a configuration diagram of gas safety device 21 according to a first exemplary embodiment. Gas safety device 21 of the present exemplary embodiment has a basic configuration identical to that of a conventional example illustrated in FIG. 6, and includes flow rate measurement unit 15 for measuring a flow rate of gas flowing in flow path 1, control circuit 9 that integrates the amount of gas usage using measurement data on flow rates measured by flow rate measurement unit 15, a display unit (not illustrated), and the like.

Gas safety device 21 is different from the conventional example in that absolute pressure sensor 5 being a first absolute pressure sensor and absolute pressure sensor 7 being a second absolute pressure sensor, which are capable of measuring an absolute pressure, are provided instead of pressure sensor 113 of a differential pressure measurement type for measuring supply pressure illustrated in FIG. 6. Absolute pressure sensor 5 is mounted as an electronic component on electronic circuit 16 installed in a gas atmosphere inside flow path 1 to measure an absolute pressure of gas inside flow path 1 using a signal from control circuit 9.

Absolute pressure sensor 7 is mounted as an electronic component on control circuit 9 installed on an atmosphere side outside flow path 1 to measures an absolute pressure on the atmosphere side using a signal from control circuit 9. Then, gas pressure determination unit 8 determines change in gas supply pressure from the two absolute pressures measured by respective absolute pressure sensor 5 and absolute pressure sensor 7 to determine whether there is an abnormality such as a gas leakage.

When an abnormality is detected based on a flow rate measured by flow rate measurement unit 15, or when gas pressure determination unit 8 determines an abnormality such as a gas leakage, control circuit 9 causes shutoff valve 2 to shut off flow path 1 to stop gas supply.

As described above, the present exemplary embodiment enables fluctuation of gas supply pressure to be detected by using two absolute pressure sensors 5 and 7 capable of measuring an absolute pressure, and thus does not require a through-hole conventionally required to be provided in a flow path when a pressure sensor of a differential pressure measurement type is used. This enables providing a gas safety device capable of preventing ejection of gas even when temperature in a periphery of the gas safety device becomes high due to a fire or the like in the periphery.

Structure in which two absolute pressure sensors 5 and 7 are mounted on respective circuit boards such as electronic circuit 16 and control circuit 9 does not require not only a component for structurally fixing a conventional relative pressure sensor to a housing of a flowmeter, but also a lead wire or the like for electrically connecting the control circuit and a relative pressure sensor, and thus enabling a significant cost reduction. Additionally, eliminating a lead wire for a relative pressure sensor installed inside the gas safety device allows the gas safety device to be less likely to be affected by external electrical noise and the like, and thus enables achieving a more reliable gas safety device.

Although the present exemplary embodiment describes the structure in which absolute pressure sensor 5 being the first absolute pressure sensor is mounted on electronic circuit 16 installed in the gas atmosphere inside flow path 1, it is needless to say that absolute pressure sensor 5 may be mounted anywhere inside flow path 1. Although absolute pressure sensor 7 being the second absolute pressure sensor is described as being mounted on control circuit 9 installed on the atmosphere side outside flow path 1, a mounting place is not limited as long as the atmospheric pressure can be measured.

Second Exemplary Embodiment

Figure 2:
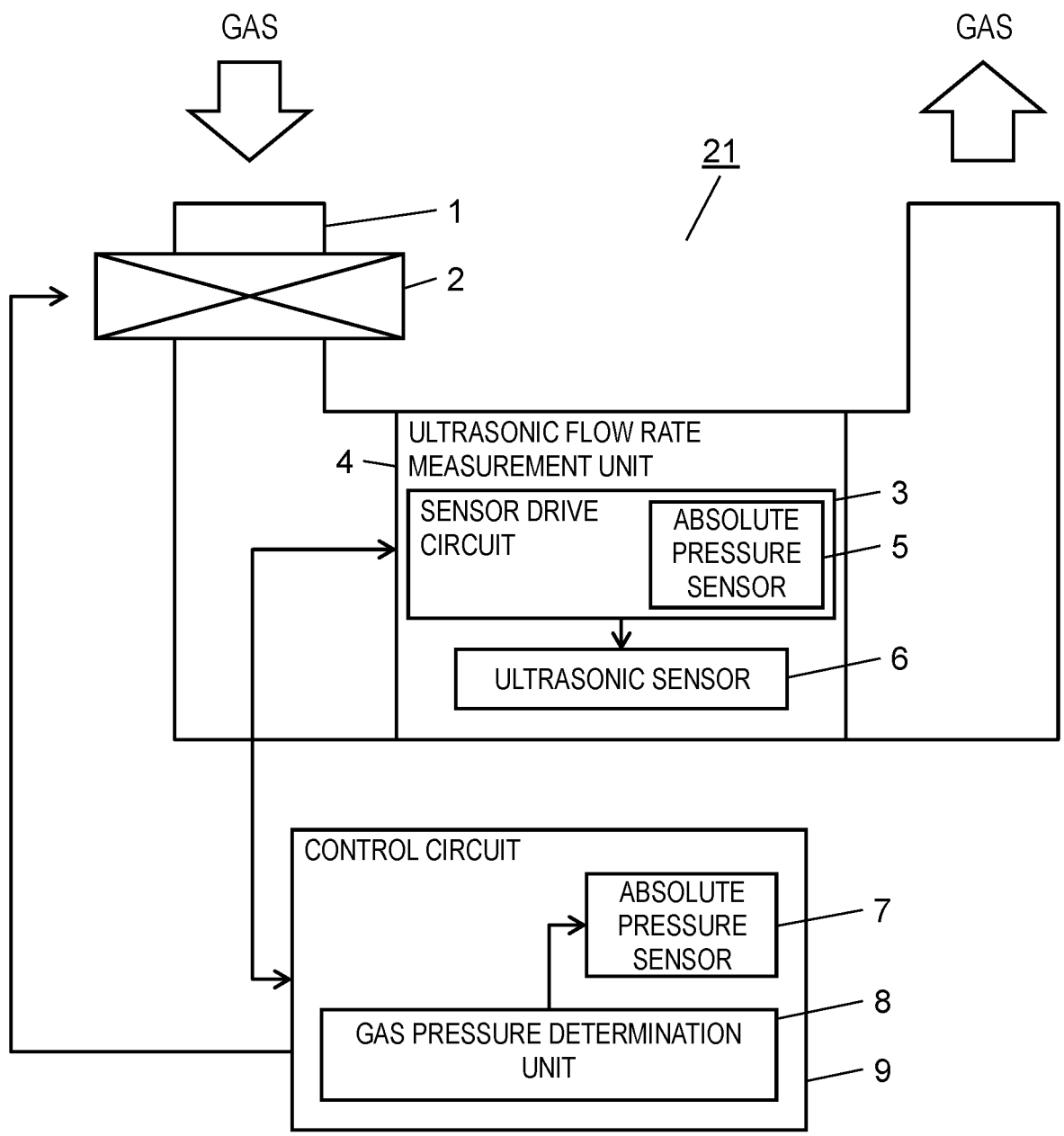
FIG. 2 is a configuration diagram of a gas safety device according to a second exemplary embodiment.

FIG. 2 is a configuration diagram of gas safety device 22 according to a second exemplary embodiment. Gas safety device 22 has a basic configuration identical to that of FIG. 1 used in the description of the first exemplary embodiment. The second exemplary embodiment is different from the first exemplary embodiment in that ultrasonic flow rate measurement unit 4 acquired by integrating ultrasonic sensor 6 with ultrasonic sensor drive circuit 3 is installed in the gas atmosphere inside flow path 1 as a flow rate measurement unit.

Absolute pressure sensor 5 being the first absolute pressure sensor is mounted on a circuit board formed with ultrasonic sensor drive circuit 3. Absolute pressure sensor 5 also can be controlled by controlling ultrasonic flow rate measurement unit 4 from control circuit 9, and control circuit 9 operates as in the first exemplary embodiment.

As described above, the present exemplary embodiment enables fluctuation of gas supply pressure to be detected by using the two absolute pressure sensors capable of measuring an absolute pressure, and thus does not require a through-hole conventionally required to be provided in a flow path when a pressure sensor of a differential pressure measurement type is used. This enables providing a gas safety device capable of preventing ejection of gas even when temperature in a periphery of the gas safety device becomes high due to a fire or the like in the periphery.

Third Exemplary Embodiment

Figure 3:
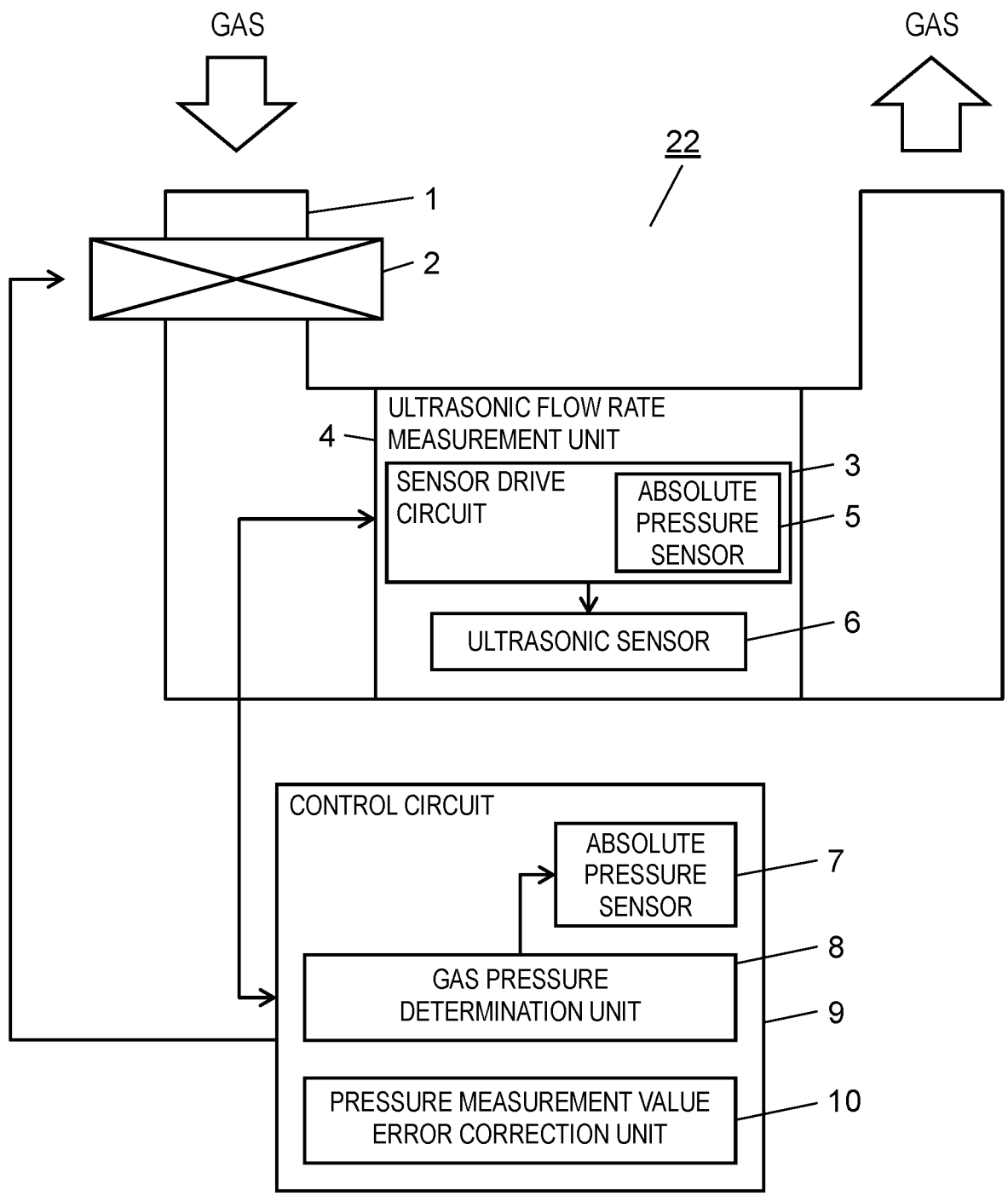
FIG. 3 is a configuration diagram of a gas safety device according to a third exemplary embodiment.

FIG. 3 is a configuration diagram of gas safety device 23 according to a third exemplary embodiment. Gas safety device 23 has a basic configuration identical to that of FIG. 2 used in the description of the second exemplary embodiment. The third exemplary embodiment is different from the second exemplary embodiment in that control circuit 9 includes pressure measurement value error correction unit 10.

Pressure measurement value error correction unit 10 stores a difference between measured values of two absolute pressure sensors 5 and 7 as a correction value at the time of production of a gas safety device and at regular or arbitrary timing under conditions where pressure on a gas supply pressure side (i.e., pressure inside flow path 1) and pressure on an atmosphere side are equal to each other. Then, a relative measurement error between two absolute pressure sensors 5, 7 when gas pressure determination unit 8 determines change in gas supply pressure is corrected. This enables improvement in determination accuracy in gas pressure determination unit 8.

Pressure measurement value error correction unit 10 can acquire the correction value by a method for transmitting a signal to control circuit 9 using a switch (not illustrated) installed in a housing of the gas safety device or communication (not illustrated) from the outside.

As described above, the present exemplary embodiment enables correcting a measurement error between two absolute pressure sensors 5 and 7 by correcting a correction value not only at the time of production but also at regular or arbitrary timing, so that gas pressure determination unit 8 can be improved in determination accuracy.

Fourth Exemplary Embodiment

Figure 4:
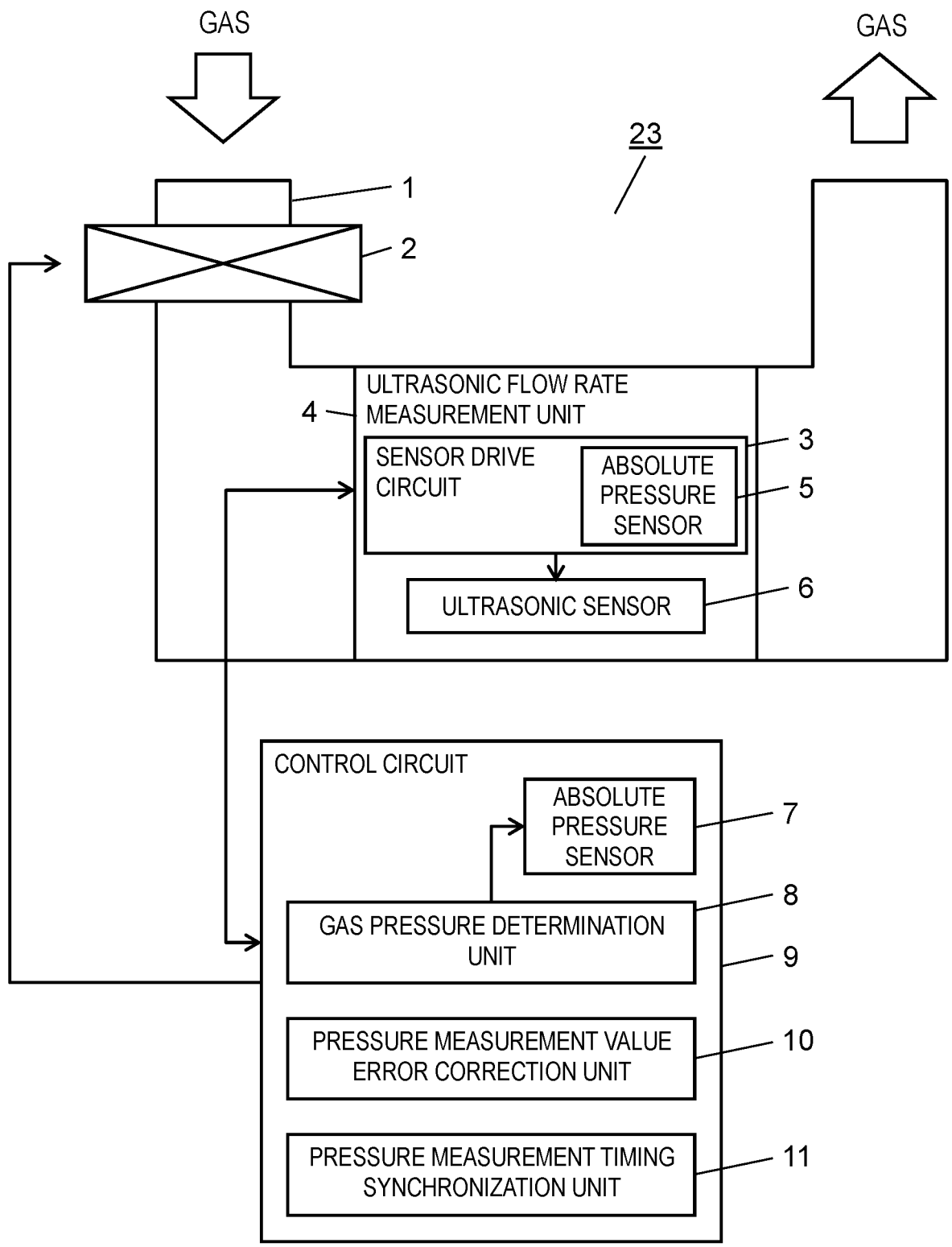
FIG. 4 is a configuration diagram of a gas safety device according to a fourth exemplary embodiment.

FIG. 4 is a configuration diagram of gas safety device 24 according to a fourth exemplary embodiment. Gas safety device 24 has a basic configuration identical to that of FIG. 3 used in the description of the third exemplary embodiment. The fourth exemplary embodiment is different from the third exemplary embodiment in that control circuit 9 includes pressure measurement timing synchronization unit 11.

Pressure measurement timing synchronization unit 11 has a function of synchronizing timing of measuring pressure using two absolute pressure sensors 5, 7. When the timing of measuring pressure using two absolute pressure sensors 5, 7 is synchronized, gas pressure determination unit 8 can accurately measure change in pressure by eliminating a measurement error between two absolute pressure sensors 5, 7 caused by temporal change in gas supply pressure due to change in peripheral temperature and whether gas is used or not.

As described above, the present exemplary embodiment enables improvement in determination accuracy of gas pressure determination unit 8 by synchronizing the timing of measuring pressure using two absolute pressure sensors 5, 7.

Fifth Exemplary Embodiment

Figure 5:
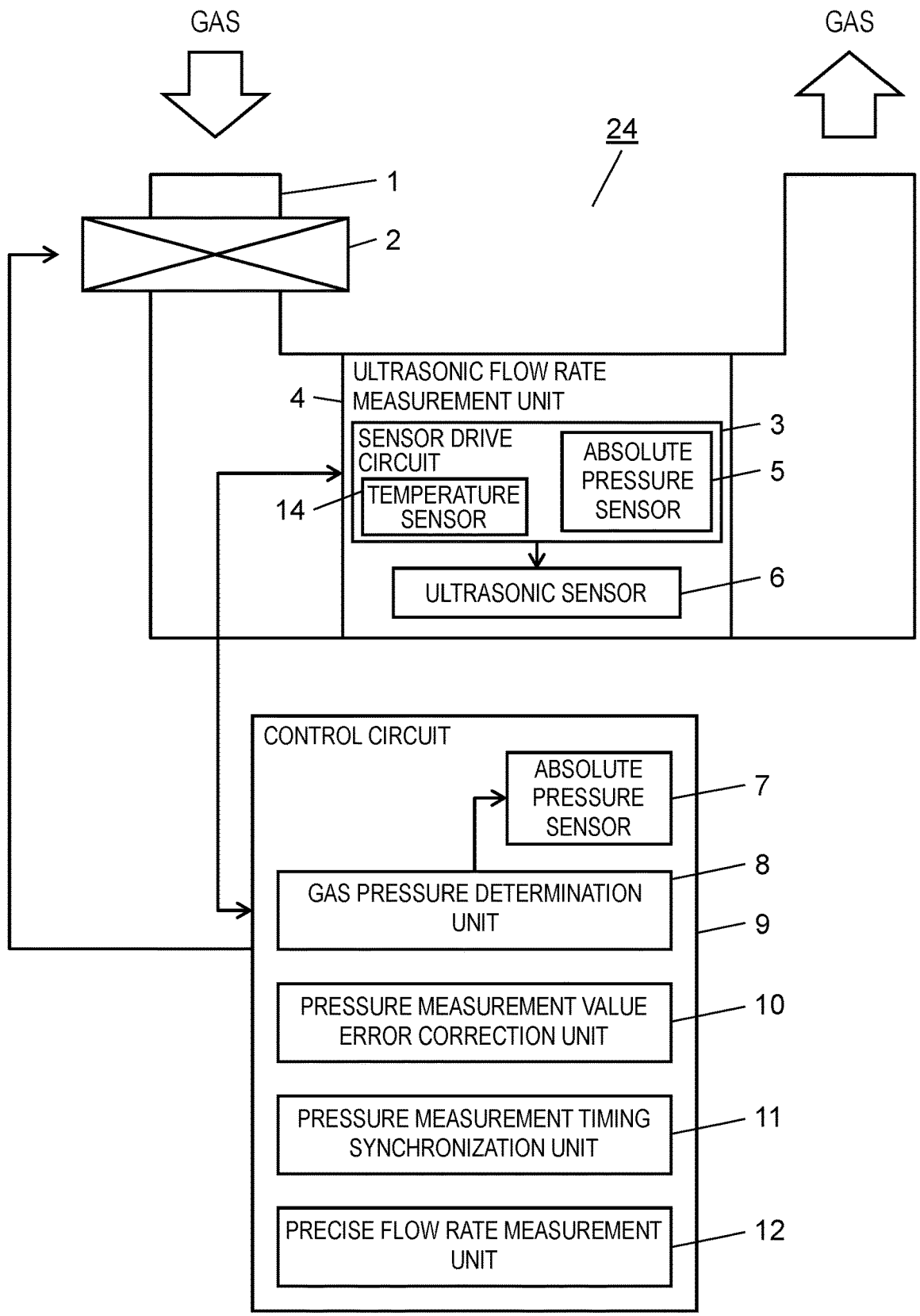
FIG. 5 is a configuration diagram of a gas safety device according to a fifth exemplary embodiment.

FIG. 5 is a configuration diagram of gas safety device 25 according to a fifth exemplary embodiment. Gas safety device 25 has a basic configuration identical to that of FIG. 4 used in the description of the fourth exemplary embodiment. The fifth exemplary embodiment is different from the fourth exemplary embodiment in that control circuit 9 includes precise flow rate measurement unit 12.

Precise flow rate measurement unit 12 allows absolute pressure sensor 5 being a first absolute pressure sensor to measure pressure at predetermined timing when ultrasonic flow rate measurement unit 4 determines that a flow rate of gas is equal to or more than a predetermined flow rate. This enables a flow rate and pressure of gas to be measured at the same time, so that pressure of a measured flow rate can be corrected to enable improvement in flow rate measurement accuracy.

As illustrated in FIG. 5, the present exemplary embodiment allows temperature sensor 14 to be mounted on a circuit board formed with ultrasonic sensor drive circuit 3 so that temperature of gas can be measured. Allowing precise flow rate measurement unit 12 to measure each of a flow rate, temperature, and an absolute pressure at the same timing or similar timing in this configuration enables temperature correction, pressure correction, and calorie conversion of a flow rate.

As described above, the present exemplary embodiment allows precise flow rate measurement unit 12 to measure a flow rate, pressure, and temperature at the same timing, so that pressure of a measured flow rate can be corrected, and thus the flow rate measurement accuracy can be improved. The present exemplary embodiment also enables calorie conversion.

Although the present exemplary embodiment describes the flow rate measurement unit of an ultrasonic type, another type capable of measuring an instantaneous flow rate, such as a thermal type or a fluidic type, may be used.

Sixth Exemplary Embodiment

Features of a gas safety device according to a sixth exemplary embodiment include determination whether an atmospheric pressure is low due to a climate change such as a typhoon, and whether the gas safety device is installed at a high place, using an atmospheric pressure measured by absolute pressure sensor 7 that is lower than a normal atmospheric pressure by a predetermined value. This enables a response, such as changing an abnormality determination value for supply pressure or allowing abnormality determination to be invalid, during a period of time where an atmospheric pressure decreases from a normal atmospheric pressure by a predetermined value, by checking change in atmospheric pressure after the gas safety device is installed. When the atmospheric pressure is already lower than the predetermined pressure at the time of installation of the gas safety device, the gas safety device is determined to be installed at a high place. Then, unnecessary abnormality determination can be avoided by changing a determination value for abnormal supply pressure.

As described above, the present exemplary embodiment does not cause erroneous determination such as abnormality determination of supply pressure even in a low-pressure state caused by environment around the gas safety device, so that a more reliable gas safety device can be provided.

As described above, a gas safety device according to a first disclosure includes a flow path for flowing gas, a flow rate measurement unit for measuring a flow rate of the gas flowing through the flow path, a first absolute pressure sensor disposed inside the flow path to measure an absolute pressure of the gas, a second absolute pressure sensor disposed outside the flow path to measure an absolute pressure of atmospheric pressure, and a gas pressure determination unit that measures a change in gas supply pressure from the absolute pressure of the gas and the absolute pressure of the atmospheric pressure measured by the first absolute pressure sensor and the second absolute pressure sensor, respectively. The gas safety device according to the first disclosure further includes a shutoff valve that shuts off the flow path, and a control circuit that controls the flow rate measurement unit and that causes the shutoff valve to shut off the flow path when determining abnormality from the flow rate of the gas measured by the flow rate measurement unit or the change in gas supply pressure measured by the gas pressure determination unit.

This configuration does not require a through-hole for a pressure sensor to be provided in the flow path, and thus enables preventing ejection of gas even when temperature in a periphery of the gas safety device becomes high due to a fire or the like in the periphery.

A gas safety device according to a second disclosure may be configured in the first disclosure such that the flow rate measurement unit includes a measurement circuit disposed inside the flow path, the first absolute pressure sensor is on the measurement circuit, the control circuit is disposed outside the flow path, and the second absolute pressure sensor is disposed on the control circuit.

This configuration does not require a mechanism for mounting a pressure sensor and enables using a pressure sensor composed of electronic components mountable on a circuit board, so that a gas safety device with a cheaper and simpler structure can be provided.

A gas safety device according to a third disclosure may be configured in the second disclosure such that the flow rate measurement unit includes an ultrasonic flow rate measurement unit acquired by integrating an ultrasonic sensor with an ultrasonic sensor drive circuit that drives the ultrasonic sensor to measure a flow rate, the ultrasonic flow rate measurement unit is installed in a gas atmosphere, the first absolute pressure sensor is provided on the ultrasonic sensor drive circuit, and the first absolute pressure sensor is controlled by controlling the ultrasonic flow rate measurement unit using the control circuit.

This configuration enables also the absolute pressure sensor on the ultrasonic sensor drive circuit to be controlled, so that a through-hole for a pressure sensor is not required to be provided in the flow path, and thus ejection of gas can be prevented even when temperature in a periphery of the gas safety device becomes high due to a fire or the like in the periphery.

A gas safety device according to a fourth disclosure may be configured in any one of the first to third disclosures, including a pressure measurement value error correction unit that corrects an error in a measured value generated between the first absolute pressure sensor and the second absolute pressure sensor.

This configuration does not require a through-hole for a pressure sensor to be provided in the flow path, and thus enables not only preventing ejection of gas even when temperature in a periphery of the gas safety device becomes high due to a fire or the like in the periphery, but also correcting an initial characteristic error between the two absolute pressure sensors to enable fluctuation of gas supply pressure to be determined more accurately.

A gas safety device according to a fifth disclosure may be configured in any one of the first to third disclosures, including a pressure measurement timing synchronization unit that synchronizes measurement timing of the first absolute pressure sensor and measurement timing of the second absolute pressure sensor with each other.

This configuration does not require a through-hole for a pressure sensor to be provided in the flow path, and thus enables not only preventing ejection of gas even when temperature in a periphery of the gas safety device becomes high due to a fire or the like in the periphery, but also correcting a pressure error due to timing on a gas atmosphere side and an atmosphere side to enable fluctuation of gas supply pressure to be determined more accurately.

A gas safety device according to a sixth disclosure may be configured in the fourth disclosure, including a pressure measurement timing synchronization unit that synchronizes measurement timing of the first absolute pressure sensor and measurement timing of the second absolute pressure sensor with each other.

This configuration does not require a through-hole for a pressure sensor to be provided in the flow path, and thus enables not only preventing ejection of gas even when temperature in a periphery of the gas safety device becomes high due to a fire or the like in the periphery, but also correcting a pressure error due to timing on a gas atmosphere side and an atmosphere side to enable fluctuation of gas supply pressure to be determined more accurately.

A gas safety device according to a seventh disclosure may be configured in any one of the first to third disclosures, including a precise flow rate measurement means unit that synchronizes pressure measurement timing of the first absolute pressure sensor, measurement timing of the second absolute pressure sensor, and flow rate measurement timing of the flow rate measurement unit with each other.

This configuration does not require a through-hole for a pressure sensor to be provided in the flow path, and enables not only preventing ejection of gas even when temperature in a periphery of the gas safety device becomes high due to a fire or the like in the periphery, but also measuring an absolute pressure when gas flows to enable pressure correction for a flow rate.

A gas safety device according to an eighth disclosure may be configured in the fourth disclosure, including a precise flow rate measurement means unit that synchronizes pressure measurement timing of the first absolute pressure sensor, pressure measurement timing of the second absolute pressure sensor, and flow rate measurement timing of the flow rate measurement unit with each other.

This configuration does not require a through-hole for a pressure sensor to be provided in the flow path, and enables not only preventing ejection of gas even when temperature in a periphery of the gas safety device becomes high due to a fire or the like in the periphery, but also measuring an absolute pressure when gas flows to enable pressure correction for a flow rate.

A gas safety device according to a ninth disclosure may be configured in the fifth disclosure, including a precise flow rate measurement means unit that synchronizes pressure measurement timing of the first absolute pressure sensor, pressure measurement timing of the second absolute pressure sensor, and flow rate measurement timing of the flow rate measurement unit with each other.

This configuration does not require a through-hole for a pressure sensor to be provided in the flow path, and enables not only preventing ejection of gas even when temperature in a periphery of the gas safety device becomes high due to a fire or the like in the periphery, but also measuring an absolute pressure when gas flows to enable pressure correction for a flow rate.

A gas safety device according to a tenth disclosure may be configured in the sixth disclosure, including a precise flow rate measurement means unit that synchronizes pressure measurement timing of the first absolute pressure sensor, pressure measurement timing of the second absolute pressure sensor, and flow rate measurement timing of the flow rate measurement unit with each other.

This configuration does not require a through-hole for a pressure sensor to be provided in the flow path, and enables not only preventing ejection of gas even when temperature in a periphery of the gas safety device becomes high due to a fire or the like in the periphery, but also measuring an absolute pressure when gas flows to enable pressure correction for a flow rate.

A gas safety device according to an eleventh disclosure may be configured in any one of the first to third disclosures such that a low-pressure state due to a climate change or an altitude of an installation place may be determined using atmospheric pressure measured by the second absolute pressure sensor.

This configuration enables preventing pressure abnormality from being wrongly determined due to the low-pressure state.

INDUSTRIAL APPLICABILITY

As described above, the gas safety device according to the present disclosure is capable of preventing ejection of gas through the through-hole for the pressure sensor even when temperature in a periphery of the gas safety device becomes high due to a fire or the like in the periphery. This enables not only improving safety, but also providing a cheaper gas safety device, so that the gas safety device can be applied to general household and commercial gas meters.

REFERENCE MARKS IN THE DRAWINGS 1 flow path
2 shutoff valve
3 ultrasonic sensor drive circuit (measurement circuit)
4 ultrasonic flow rate measurement unit
5 absolute pressure sensor (first absolute pressure sensor)
6 ultrasonic sensor
7 absolute pressure sensor (second absolute pressure sensor)
8 gas pressure determination unit
9 control circuit
10 pressure measurement value error correction unit
11 pressure measurement timing synchronization unit
12 precise flow rate measurement unit
14 temperature sensor
15 flow rate measurement unit (measurement circuit)
16 electronic circuit
21, 22, 23, 24, 25 gas safety device

The invention claimed is:

1. A gas safety device comprising:
a flow path for flow of a gas;
a flow rate measurement unit for measuring a flow rate of the gas flowing through the flow path;
a first absolute pressure sensor mounted inside the flow path and configured to measure an absolute pressure of the gas;
a second absolute pressure sensor mounted outside the flow path and configured to measure an absolute pressure of an atmospheric pressure;
a gas pressure determination unit configured to measure a change in a gas supply pressure from the absolute pressure of the gas and the absolute pressure of the atmospheric pressure measured by the first absolute pressure sensor and the second absolute pressure sensor, respectively;
a shutoff valve configured to shut off the flow path; and
a control circuit configured to: (i) control the flow rate measurement unit; and (ii) cause the shutoff valve to shut off the flow path when determining an abnormality from the flow rate of the gas measured by the flow rate measurement unit or the change in the gas supply pressure measured by the gas pressure determination unit,
wherein:
the flow rate measurement unit is mounted inside the flow path, the flow rate measurement unit including a measurement circuit;
the first absolute pressure sensor is mounted on the measurement circuit;
the control circuit is mounted outside the flow path; and
the second absolute pressure sensor is mounted on the control circuit.

2. The gas safety device according to claim 1, wherein:
the flow rate measurement unit includes an ultrasonic flow rate measurement unit comprised of an ultrasonic sensor integrated with an ultrasonic sensor drive circuit configured to drive the ultrasonic sensor to measure the flow rate of the gas;
the ultrasonic flow rate measurement unit is mounted in a gas atmosphere;
the first absolute pressure sensor is mounted on the ultrasonic sensor drive circuit; and
the control circuit is configured to control the ultrasonic flow rate measurement unit to control the first absolute pressure sensor.

3. The gas safety device according to claim 2, further comprising a precise flow rate measurement unit configured to synchronize a pressure measurement timing of the first absolute pressure sensor, a pressure measurement timing of the second absolute pressure sensor, and a flow rate measurement timing of the flow rate measurement unit with each other.

4. The gas safety device according to claim 2, further comprising a pressure measurement value error correction unit configured to correct an error in a measured value generated between the first absolute pressure sensor and the second absolute pressure sensor.

5. The gas safety device according to claim 2, further comprising a pressure measurement timing synchronization unit configured to synchronize a measurement timing of the first absolute pressure sensor and a measurement timing of the second absolute pressure sensor with each other.

6. The gas safety device according to claim 2, wherein a low-pressure state due to a climate change or an altitude of an installation place is determined using the atmospheric pressure measured by the second absolute pressure sensor.

7. The gas safety device according to claim 1, further comprising a pressure measurement value error correction unit configured to correct an error in a measured value generated between the first absolute pressure sensor and the second absolute pressure sensor.

8. The gas safety device according to claim 1, further comprising a pressure measurement timing synchronization unit configured to synchronize a measurement timing of the first absolute pressure sensor and a measurement timing of the second absolute pressure sensor with each other.

9. The gas safety device according to claim 1, further comprising a precise flow rate measurement unit configured to synchronize a pressure measurement timing of the first absolute pressure sensor, a pressure measurement timing of the second absolute pressure sensor, and a flow rate measurement timing of the flow rate measurement unit with each other.

10. The gas safety device according to claim 1, wherein a low-pressure state due to a climate change or an altitude of an installation place is determined using the atmospheric pressure measured by the second absolute pressure sensor.

11. The gas safety device according to claim 1, wherein the flow path is a single duct and the first absolute pressure sensor and the flow rate measurement unit including the measurement circuit are mounted inside the single duct.

* * * * *